United States Patent [19]

Barth et al.

[11] Patent Number: 4,562,490
[45] Date of Patent: Dec. 31, 1985

[54] JACKPOT-RESISTANT MAGNETIC CARD ENCODING

[75] Inventors: Merlyn Barth, Glendale; Joseph Kosednar, Creve Coeur, both of Mo.

[73] Assignee: Interface Control Systems, Inc., St. Louis, Mo.

[21] Appl. No.: 568,383

[22] Filed: Jan. 5, 1984

[51] Int. Cl.³ .............................................. G11B 5/09
[52] U.S. Cl. ....................................................... 360/44
[58] Field of Search ............... 360/40, 44, 2; 235/493, 235/494

[56] References Cited

U.S. PATENT DOCUMENTS 3,646,534  2/1972  Miller ..................................... 360/44
4,060,837 11/1977  Rynearson ............................. 360/44
4,426,667  1/1984  Masher et al. ......................... 360/44

Primary Examiner—Vincent P. Canney
Attorney, Agent, or Firm—Jerome A. Gross

[57] ABSTRACT

A method of magnetic encoding of credit instruments having a strip form magnetic recording medium provides at least one data field on the strip. First and second magnetic field orientations are selected for recordation on the medium of successive, adjacent bit regions in an alternating field orientation pattern with the transition between such orientations defining the transition from one bit region to the next, signalling the initiation of a recorded bit representing either a binary "1" or a binary "0". A first bit region length $d_1$ for representing one of the binary values "0" and a second bit region length $d_2$ for representing the other binary value as well as the ratio of $d_1/d_2$ are selected, with $d_1/d_2$ being from about 0.1 to about 0.5. Thus, the magnetic field transition between adjacent bit regions signals a binary bit and the length of each bit region represents its binary value. Data is recorded in binary format on the medium in one or more data fields using the bit length $d_1$ and $d_2$ and ratio $d_1/d_2$ so selected. The length of the data fields depends upon the actual value of the data so recorded. The variable data field length assures against jackpotting by unauthorized masking of one of multiple data fields.

7 Claims, 7 Drawing Figures

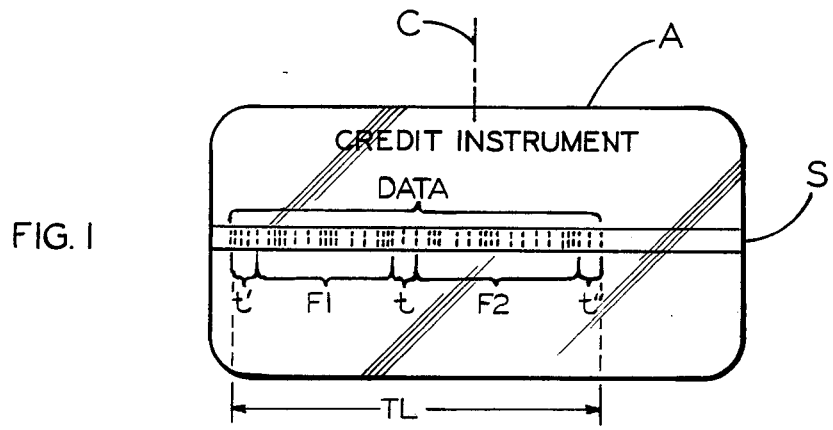
FIG. 1
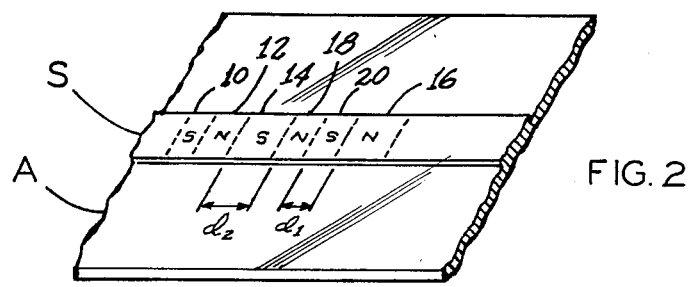
FIG. 2
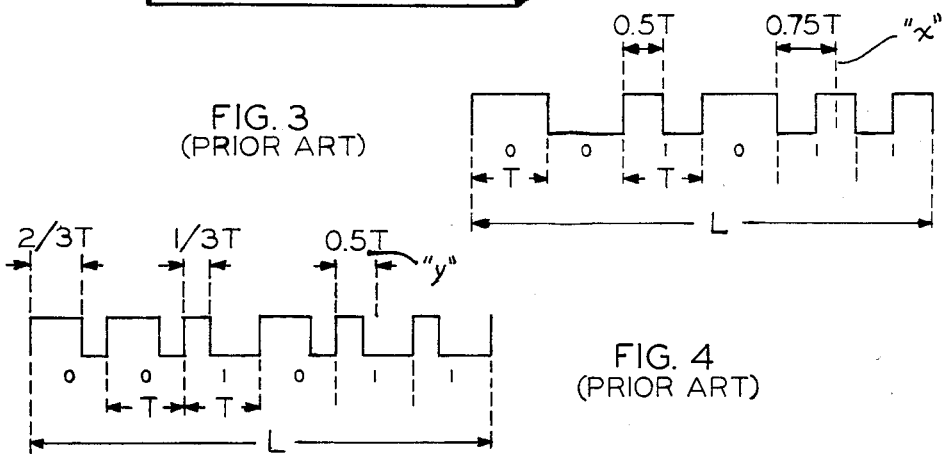
FIG. 3 (PRIOR ART)
FIG. 4 (PRIOR ART)
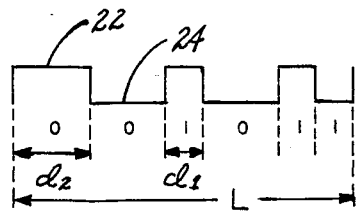
FIG. 5
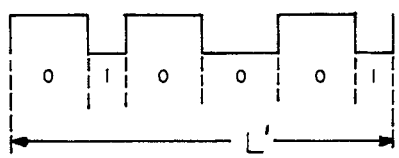
FIG. 6
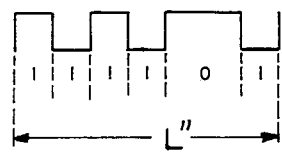
FIG. 7

JACKPOT-RESISTANT MAGNETIC CARD ENCODING

TECHNICAL FIELD

This invention relates to magnetic encoding of credit instruments, particularly of the plastic credit card type having a flat magnetic surface on which data is stored magnetically in binary encoded format, longitudinally arranged in multiple data fields.

BACKGROUND ART

Credit instruments of the aforesaid character, such as so-called "debit" cards, are typically encoded with multiple identical data fields along the length of a strip or so-called "stripe" of recording media. This permits at least one of the data fields to be magnetically sensed and "read" for consummating a credit or other validation operation even if one data field is not readable, such as when data field is partly erased, or the magnetic media is scratched or otherwise damaged.

Such separation of the strip into separate data fields poses the risk the persons may authorizedly screen or cover portions of the strip, as by taping over them, to expose only one data field. The so-called screened card is then inserted into a credit issuing or validating mechanism to permit or cause a transaction to occur. Then, even though the exposed unscreened portion and its exposed data field may be cancelled, or rewritten, as with a lowered credit availability, the screened data fields still remain intact and may be used illegally to obtain additional transactions, such as in vending apparatus for which the card is designed. This is referred to as "jackpotting".

Such jackpotting by screening of a data field requires that the perpetrator determine in advance the locations on the strip at which data fields begin and end. In prior art magnetic encoding, it has often been the practice to divide the strip symmetrically about a center point into two distinct data fields. This makes jackpotting by a screening stratagem easy. A more sophisticated approach previously utilized is to separate the successive data fields by a series of "1's" or "0's" but without locating same symmetrically with respect to the card. Thus, the data may begin near one end of the strip and extend over only a portion of the strip.

However, prior magnetic encoding schemes, such as the "F-2" code and "Ratio" code, are such that magnetic "1's" and "0's" represented by magnetized regions each occupy the same interval along the data strip. Thus, in a binary coding scheme using only "1's" and "0's", each of two identical data field will be of an identical length. The would-be jackpotter then has to divide the total, or combined, length of the two data fields into two equal length halves being thereby given a good possibility that screening, such as by tape obscuration, of one half will permit a credit transaction to be consummated with the unobscured data field, thereby permitting a later jackpotting with the obscured data field.

In addition to being resistant to such jackpotting or unauthorized multiple use as described above, a magnetically encoded credit instrument such as especially a debit card must be resistant to errors in reading the magnetically encoded information thereon, such as produced by vibration and intermittent magnetic reading and writing causing abrupt, spurious variations in pulse time characteristics, termed "jitter", resulting from any uneven, but often unavoidable, movement of the card through a magnetic card reader. Such jitter is likely to result, for example, from intermittency of friction in a drive system which moves the card through the reader. Any change in the magnetic coding scheme to make it less prone to jackpotting carries with it the risk that the card or other credit instrument so coded will be more prone to reading or writing errors resulting from jitter.

In addition, an important constraint in the use of magnetic coding schemes is the effective bandwidth of electronic circuitry used for reading and writing the magnetically encoded data. If pulse widths or encoded data transitions become too short, as because of a poorly chosen coding scheme, then the bandwidth of the circuitry, as limited chiefly by its response time (in effect determining an upper frequency limit in a Fourier series transformation of the involved pulse waveforms), may be inadequate.

SUMMARY OF THE INVENTION

An object of the present invention is the provision of a method of magnetically encoding of credit cards and other credit instruments which makes such cards and instruments less prone to jitter-produced errors in the reading and writing of magnetically encoded information thereon.

Another object of the invention is the provision of such an encoding method which, when used with credit cards and other credit instruments having identical data in multiple data fields, renders jackpotting of such cards or instruments vastly more difficult.

Among further objects of the invention may be noted the provision of such an encoding method which does not require substantially high bandwidth of circuitry used for reading or writing the magnetically encoded information thereon; and which may be readily changed to accomodate systems contraints of jitter tolerance, or bandwidth; or both.

An additional object of the invention is the provision of such an encoding method will allow magnetically encoded data to be more compactly recorded on a credit card or other credit instrument.

Briefly, magnetic encoding of credit instruments, including credit cards, according to the invention constitutes an NRZ (non-return to zero) method involving selected first and second magnetic orientations for recording on a strip-form magnetic recording medium on the instrument. The transition between these orientations on the recording medium represents the initiation of a recorded bit representing either a binary "1" or a binary "0". The method includes establishing a first bit length $d_1$ for representing one of the binary values such as a "1" and a second bit length $d_2$ for representing the other binary value, e.g., a "0". The ratio of $d_1/d_2$ is then selected to be a value from about 0.1 to about 0.5; such that when read or recorded, each transition between the orientations represents the start of a new binary bit but the duration of the bit represents its value, i.e., whether a "1" or "0"; since there are a plurality of bits in a recorded data field wherein the number of "1's" and "0's" will depend upon the value of the data so recorded or to be recorded, the physical length of the field required for recording it upon the strip will vary. Accordingly, where the strip is recorded with multiple data fields, the transition between data fields will be difficult to determine, as by eye inspection of metallic dust on the strip. Further, when the data fields are identical, the overall combined length of the fields will vary, preventing jackpotting or other unauthorized use by simply occluding either half of the strip.

The Drawings

FIG. 1 is a plan view of a credit instrument of the credit card type carrying a strip of magnetic recording media recorded in accordance with the present invention.

FIG. 2 is a fragmentary perspective view of the credit card of FIG. 1.

FIG. 3 is a timing diagram illustrating the so-called F-2F prior art coding technique.

FIG. 4 is a timing diagram illustrating the so-called ratio prior art coding technique.

FIGS. 5–7 are timing diagrams illustrating features of the coding method of the invention.

BEST MODE FOR CARRYING OUT THE INVENTION

Referring to FIG. 1, a credit instrument of the credit card type is designated A, being of conventional flat, elongated wallet-sized character and formed of thermoplastic material or otherwise molded of synthetic resin material. Card A is provided on its face with a thin strip S of magnetic recording media across the length of the card. Strip S may be any of various known forms and substances useful for magnetic recording and reading of data on the strip in binary recorded format, e.g., as of ink having a ferric oxide filler and printed on the card, or as a separate strip of magnetic tape heat-transferred to the card, etc. Although but a single strip S is shown, additional strips may be provided, as well as on either face of the card, and with orientations different from that shown.

Although strip S is shown vertically centered on card A, it may be positioned with vertical asymmetry, as for permitting reading or writing on the strip only for one orientation of card A in a magnetic card reader or writer (referred to herein as a "card reader"). However, card A may have its strip S read or written by a variety of different possible card readers consistent with practice of the invention.

Although data on strip S would not actually be normally apparent, it is representatively shown on strip S to schematically represent its appearance as if specially treated in a manner known to those skilled in the art. Thus, it will be seen that the data begins proximate the left edge of card A but terminates, for reasons later more apparent, an indeterminate distance from the right edge, but in any event such that the overall data field is of total length TL, asymmetric with respect to the center line C of the card.

As is conventional, the data is presented, in actuality, by plural identical data fields F1, F2, but separated by a lead-in or trailer t, and with there being additional trailers or lead-ins t', t" at the beginning of field F1 and end of field F2, respectively. Such portions t, t', t" may simply be constituted by recording of successive bits representing a string of several "0's", for example, to permit the card reader circuitry to respond properly to the data actually represented by fields F1, F2.

Referring to FIG. 2, a portion of card A and strip S are shown to represent the recorded regions thereon. In encoding according to the invention, first and second magnetic field orientations are selected, being opposite in orientation, to provide NRZ recording on strip S in the form of successive, adjacent bit regions, i.e., magnetically recorded regions, and with the boundary between adjacent region being determined by the magnetic field transition, e.g., transition from north to south, from one length to the next. The length of each such region vary, being short or long, in accordance with the binary value of the bit represented by each such region.

Thus, for example, at 10, 12 are shown two short regions, or bits, but of opposite polarity. Each represents a binary "1". Similarly, at 14, 16 are longer regions, each of length $d_2$, and representing "0" bits, even though of opposite magnetic polarity. Regions 14, 16 are separated by two shorter regions 18, 20 each of length $d_1$, representing "1" bits. The regions shown schematically are but a few of those actually present in strip S, but together represent exemplary data or data portion constituted by the binary number or number segment, 100110.

The invention, being concerned with the method of encoding such credit instruments and the like, does not preclude various arrangements of data such as in hexadecimal; and similarly permit the use of parity bits and stop bits, etc.

Although the magnetic orientations shown having polar orientations perpendicular to the plane of the card are merely to facilitate illustration, it should be understood that the polar orientation instead in actuality may be parallel to the plane of the card, as well as permissibly being skewed, rather than perpendicular to the longitudinal axis of strip S.

The timing diagrams of FIGS. 3–7 are useful for explaining the new encoding scheme of the invention, as contrasted with the prior art.

FIG. 3 illustrates the timing relationship of encoding according to the well-known "F-2F" scheme. Thus, it will be seen that high and low states are obtained, corresponding to magnetic field transitions in the recorded medium. Binary "0's" are represented by transitions in state occuring at an interval or pulse duration T, but binary "1's" are represented by a transition occuring at 0.5 T and remaining in the opposite state for 0.5 T. In effect, both "1's" and "0's" each require a total pulse interval of T. Accordingly, the overall length of a data field so encoded will vary only with the number of bits so represented, rather than with the values represented thereby. Where multiple identical data fields are so encoded, it is relatively easy to determine the combined total field length and then to obscure one data field for jackpotting purposes. If this "F-2F" encoding scheme is used, knowledge of the length of a recorded data field will always provide length of all identical fields on the card as well as knowledge of the data field length from card to card, an obvious aid to counterfeiters and jackpotters.

The jitter tolerance of F-2F coding is limited as well. Thus, note that this scheme requires establishing a detection point for determining a change of state, as at a point "x", which is 0.75 T allowing altitude of only ±0.25 T in state transition resulting from jitter for discrimination as between a "1" or "0". This corresponds to a jitter limit of 25%.

In FIG. 4, the so-called "ratio" encoding approach of the prior art is represented by the timing diagram. In this format, a ⅔—⅓ ratio is established within an interval of T, and wherein, binary values of "0" and "1" are each represented by transition, as from low to high, and maintained for pulse durations of (⅔) T and (⅓) T, respectively.

However, just as in the "F-2F" format, the "ratio" coding methodology requires timing intervals of T for each bit, whether "0" of "1" in value, and thus requiring utilization during recording of the same incremental length on the media for both "0's" and "1's". Each requires a field length L for a given number of bits.

Such "Ratio" coding requires establishment of a transition detection point, as "y" at 0.5 T within each cycle which is no closer than 0.16 ⅔ T from the points (⅓) T and (⅔) T, it will be seen that the jitter tolerance is only 16 ⅔%. In other words, a timing variation in the read or recorded pulses, whether resulting from vibration, static friction, intermittent card movement, backlash, or other cause, of greater than ±16 ⅔% will produce a bit error.

FIG. 5 illustrates the timing obtained through use of the encoding method of the invention. Unlike the foregoing prior art methodology, the new format, different intervals $d_1$ and $d_2$ are established to represent the two possible binary values. Thus, if the longer interval $d_1$ represents a binary value "0", then the shorter interval $d_2$ represents a value "1", as preferred.

A transition of state, as by going from a high state 22 corresponding to reading or writing of a first magnetic orientation, to a low state 24 corresponding to reading or writing of the other orientation within the magnetic medium, signals a successive data bit, the binary value of which is dependent upon the interval maintained. If maintained for an interval $d_1$, the bit is of binary value "0" but if for an interval $d_2$, the bit is of binary value "1".

Although in FIG. 5, the intervals $d_1$ and $d_2$ represent increments of time, they correspond to the actual incremental lengths recording on card strip S.

It is seen, therefore, that the actual overall length of either data field F1 or F2 of the card will vary dependent upon the actual number of "1's" and "0's" of the data. The would-be counterfeiter, jackpotter or other misuser of card A is, accordingly, denied knowledge of a recorded data field, as from card to card. Furthermore, if a trailer or lead-in as at t, t' or t" is utilized, but of a preselected length, the misuser is incapable, for all practical intents and purposes, of distinguishing the actual data of field F1 or F2 from the useless "data" (such as "0's") of such lead-in or the like. This makes it still more difficult to discern the length of either of data fields F1, F2 and thereby further precludes "masking" or "screening" of either such field by the unauthorized individual.

In accordance with the invention, the ratio of $d_1/d_2$ may be selected to be of a value of from about 0.1 to about 0.5, as desired to achieve a jitter tolerance and bandwidth limitation appropriate for the card reading and writing circuitry of apparatus with which card A or other credit instrument so encoded is to be used.

Yet, within such range of the ratio $d_1/d_2$, it will be manifest that substantial variations in length of the data field result. If the binary value 001011 represented by the data in the timing diagram of FIG. 3 provides a field length L, the value 010001 of the data in FIG. 4 provides a longer field length L', while the higher count of "1's" in the data 111101 of FIG. 7 provides a shorter field length l". Accordingly, as the data is varied, the recording length of a data field is varied, making it most difficult to mask either data field.

As the ratio $d_1/d_2$ is reduced, the effect of variable field length provided by the invention is ever more pronounced. In any event, except for the trivial case of all data being of that value characterized by the interval $d_1$ (such as, all "1's") the field length utilizing the new code is always shorter than for "F-2F" or "ratio" coding. In other words, the new coding method always allows more data to be recorded on a given length of strip S.

The new coding method for charge cards and comparable charge instruments is capable of far greater jitter tolerance than the above-noted prior coding methods. If for example, the ratio of $d_1/d_2$ is selected, for example, to be 0.2, then a detection point can be established which is 0.5 $(d_2-d_1)$, being thereby equidistant from the points of measurement for the ends of the intervals $d_1$ and $d_2$, and providing a jitter tolerance of 40% of the interval $d_2$.

It is generally preferred, however, that the ratio of $d_1/d_2$ be from about 0.1 to about 0.3. For $d_1/d_2=0.5$, jitter tolerance is 25%, but for $d_1/d_2=0.3$, jitter tolerance is improved to 35% of $d_2$ without imposing substantial restraints on the bandwidth of any system with which the new coding method is used. In decreasing $d_1/d_2$ to 0.2, the required increase in bandwidth if substantial is inconsequential in terms of response times of state-of-art electronic and magnetic components, but providing a 5% increase in jitter tolerance. With still further increase in jitter tolerance, i.e., to 45%, increase in bandwidth requirements are such that it is preferred that lower value of $d_1/d_2$ be not less than about 0.2. Because of the high jitter tolerance achieved at $d_1/d_2=0.3$, the specifically preferred range of $d_1/d_2$ is, therefore, from about 0.2 to about 0.3.

Card A may be a debit card by which the authorized holder may obtain vending of food, or other merchandise or sources, of value up to a maximum defined by the data. Thus, if the data represents a certain vending limit a card reader may be used to permit vending in any value up to this amount, the card being then rewritten during the transaction to reflect the remaining credit available. As an example, if a card is issued to a holder for $10, it subsequently may be inserted in the card reader of a food vending machine. If a sandwich costing $1.25 is selected, the reading mechanism then rewrites the data on the card to reflect a reduced credit availability of $8.75 and finally returns the card to its holder. The new coding method assures that, ultimately, only $10 worth of goods will be vended by use of the card.

The holder of the debit card so encoded will not appreciate that the total length of the recordation on its magnetic medium is determined by the relative numbers of "1's" and "0's" contained, and determined by the actual value of the data, within each of the data fields. The center point dividing the spaced data fields cannot be determined by the card holder without knowing the value of the data in each of the data fields, thereby rendering "masking" of either data field most improbable. Moreover, the additional "trailer" or "lead-in" segments separating the data fields as well as proximate the beginning of the first data field and end of the second data field, carrying no data, make it still more difficult to determine relative placement of the data on the card. This provides still further assurance against misuse.

The embodiments of the invention in which an exclusive property or privilege is claimed are defined as follows:

1. A method of magnetic encoding on a strip form magnetic recording medium, said method comprising selecting first and second magnetic field orientations for recordation on said medium of successive adjacent bit regions in an alternating field orientation pattern with the transition between such orientations defining the transition from one bit region to the next bit region and representing the initiation of a recorded bit representing either a binary "1" or a binary "0", selecting a first bit region length $d_1$ for representing one of the binary values of "1" or "0" and a second bit region length $d_2$ for representing the other binary value, and selecting the ratio of $d_1/d_2$ of a value from about 0.1 to about 0.5, whereby the magnetic field transition between adjacent bit regions signals a binary bit and the length of each bit region represents its value as a binary "1" or "0", and recording data in binary format on said medium in a data field using the bit length $d_1$ or $d_2$ and ratio $d_1/d_2$ so selected, said step of recording data being effected by recording such data identically in a pair of linearly spaced data fields, the method further comprising the further step of recording on said medium an additional segment of binary bits separating said data fields, whereby the total length of the recordation on said medium and thereby the center point dividing said spaced data fields cannot be determined without knowing the data represented in each of said data fields.

2. A method of magnetic encoding according to claim 1 and further comprising recording on said medium proximate at least one end of said data field an additional length of binary bits carrying no data.

3. A method of magnetic encoding according to claim 1 and further comprising recording proximate the beginning of the first such data field and end of the second such data field respective additional lengths of binary bits carrying no data.

4. A method of magnetic encoding according to claim 1 wherein the credit instrument is a credit card and the magnetic medium is a strip extending longitudinally across at least a portion of a face of the card, and said additional segment and said data fields are recorded asymmetrically relative to the longitudinal centerline of the credit card.

5. A method of magnetic encoding according to claim 1 wherein the ratio $d_1/d_2$ is selected of a value from about 0.2 to about 0.3.

6. A method of magnetic encoding of credit cards having a strip form magnetic recording medium to provide multiple identical data fields on said strip media, said method comprising selecting first and second magnetic field orientations for recordation on said medium of successive, adjacent bit regions in an alternating field orientation pattern with the transition between such orientations defining the transition from one bit region to the next bit region and representing the initiation of a recorded bit representing either a binary "1" or a binary "0", selecting a first bit region length $d_1$ for representing one of the binary values of "1" or "0" and a second bit region length $d_2$ for representing the other binary value, and selecting the ratio of $d_1/d_2$ of a value from about 0.1 to about 0.5, whereby the magnetic field transition between adjacent bit regions signals a binary bit and the length of each bit region represents its value as a binary "1" or "0", and recording identical data in binary format on said medium in linearly separated data fields using the bit lengths $d_1$ and $d_2$ and ratio $d_1/d_2$ so selected, and further recording at least an additional segment of bits carrying no data but connecting the separated data fields, whereby the overall length of information recorded on said medium varies with the relative number of "1's" and "0's" represented by each of said data fields and whereby the length of either data field is difficult of unauthorized detection.

7. A method of magnetic encoding according to claim 6 wherein the ratio $d_1/d_2$ is selected of a value from about 0.2 to about 0.3.

* * * * *

UNITED STATES PATENT AND TRADEMARK OFFICE
CERTIFICATE OF CORRECTION

PATENT NO. : 4,562,490

DATED : December 31, 1985

INVENTOR(S) : Barth, Merlyn, et al.

It is certified that error appears in the above-identified patent and that said Letters Patent is hereby corrected as shown below:

Column 4, line 58, "altitude" should be ---latitude---.

Signed and Sealed this

Twenty-fifth Day of March 1986

[SEAL]

Attest:

DONALD J. QUIGG

Attesting Officer

Commissioner of Patents and Trademarks